United States Patent [19]
Saito et al.

[11] Patent Number: 5,579,464
[45] Date of Patent: Nov. 26, 1996

[54] FREE-FORM SURFACE CREATION METHOD AND APPARATUS THEREOF

[75] Inventors: Katsu Saito, Saitama; Tetsuzo Kuragano, Tokyo, both of Japan

[73] Assignee: Sony Corporation, Tokyo, Japan

[21] Appl. No.: 433,157

[22] Filed: May 3, 1995

[30] Foreign Application Priority Data

May 18, 1994 [JP] Japan .................... 6-128122

[51] Int. Cl.⁶ ...................................... G06F 15/00
[52] U.S. Cl. ............................................ 395/141
[58] Field of Search ..................... 395/141, 129, 395/133, 138, 142; 345/118, 121

[56] References Cited

U.S. PATENT DOCUMENTS

| | | | |
|---|---|---|---|
| 4,866,631 | 9/1989 | Kuragano et al. | 364/474.29 |
| 5,065,348 | 11/1991 | Kuragano et al. | 364/119 |
| 5,410,645 | 4/1995 | Ooka et al. | 395/142 |
| 5,467,443 | 11/1995 | Johnson et al. | 395/141 |
| 5,506,947 | 4/1996 | Taubin | 395/133 |

FOREIGN PATENT DOCUMENTS

| | | | |
|---|---|---|---|
| 0393680A3 | 10/1990 | European Pat. Off. | G06F 15/353 |
| 0504889A2 | 9/1992 | European Pat. Off. | G06F 15/72 |
| 62-135965 | 6/1987 | Japan | G06F 15/60 |
| 62-151978 | 6/1987 | Japan | G06F 15/60 |
| 62-157968 | 7/1987 | Japan | G06F 15/60 |
| 62-173569 | 7/1987 | Japan | G06F 15/60 |
| 62-190564 | 8/1987 | Japan | G06F 15/60 |
| 62-216076 | 9/1987 | Japan | G06F 15/60 |
| 62-221073 | 9/1987 | Japan | G06F 15/69 |
| 62-224863 | 10/1987 | Japan | G06F 15/60 |
| 62-226281 | 10/1987 | Japan | G06F 15/60 |
| 1-175672 | 7/1989 | Japan | G06F 15/60 |
| 5-35826 | 2/1993 | Japan | G06F 15/60 |

OTHER PUBLICATIONS

Les Piegl, University of S. Florida, "On Nurbs: A Survey", IEEE Computer Graphics and Applications II (1991) Jan., No. 1, Los Alamitos, CA, pp. 55–71.

L. Piegl, "Key Developments in Computer–Aided Geometric Design", vol. 21, No. 5, Jun. 1989, London, GB, pp. 262–273.

*Primary Examiner*—Phu K. Nguyen
*Attorney, Agent, or Firm*—Limbach & Limbach

[57] ABSTRACT

The present invention relates to a free-from surface creation method and apparatus thereof which can automatically determine such internal control points that allow a plurality of patches to form a smooth surface. Based on the four normal lines ($N_{00}$, $N_{01}$, $N_{10}$, $N_{11}$) to a quadrilateral patch A at its corners and on its four edges ($E_1$, $E_2$, $E_3$, $E_4$), reference normal lines at a plurality of points defined on each edge ($E_1$, $E_2$, $E_3$, $E_4$) are determined, and each reference normal line determined on the respective plurality of points are approximated to the normal line corresponding to the plurality of points which are defined on the edges of which are shared with the quadrilateral patch A and the adjacent patch. Therefore, the internal control points of the quadrilateral patch A are determined.

8 Claims, 8 Drawing Sheets

FREE-FORM SURFACE CREATION METHOD AND APPARATUS THEREOF

BACKGROUND OF THE INVENTION

1. Field of the Invention

The present invention relates to a free-form surface creation method and apparatus thereof and is applicable to create geometries with a free-form surface by, for example, a CAD (computer-aided design) or CAM (computer-aided manufacturing) system.

2. Description of the Related Art

In the case of designing the geometry of a body with a free-form surface by using, for example, CAD technique (geometric modeling), a designer generally specifies multiple points in a three-dimensional space (which are called "nodes"), and the boundary curve network connecting respective specified multiple nodes is calculated by a computer using a predetermined vector function, thereby creating a surface represented in wire frames. Thus, it is possible to create a number of frame spaces delimited by boundary curves (hereafter, such processing is referred to as "frame processing").

The boundary curve network created by such frame processing represents by itself a general form that the designer wants to design. If it is possible to interpolating calculate a surface which can be represented by the predetermined vector function by using the boundary curves delimiting each frame space, a free-form surface (which cannot be defined by a quadratic function) designed by the designer can be created as a whole. Here, the free-form surfaces patched in each frame space form the basic elements constituting the whole surface, which are called patches.

Conventionally, in this type of CAD system, as the vector function representing the boundary curve network, cubic tensor products consisting of, for example, a Bezier expression or B-spline expression have been used for ease of calculation, which are considered to be optimal for mathematical representation of such free-form surfaces that have no special geometrical feature. That is, in a free-form surface having no special geometrical feature, when given points in the space are projected onto the x-y plane, the respective projected points are often regularly arranged in the form of a matrix. And it is known that, when the number of these projected points is represented by m×n, the respective frame spaces can be easily patched with a quadrilateral patch represented by a cubic Bezier expression. However, this conventional mathematical representation has a difficulty in the connection of each patch if it is applied to a surface having special geometrical features (for example, a surface with a greatly distorted geometry). And, this involves advanced mathematical operations so that the processing by computer is huge and complex, thus there occurs a problem that a long operation time is required.

As disclosed in Japanese laid open patent applications 62-135965, 62-151978, 62-157968, 62-173569, 62-173569, 62-190564, 62-216076, 62-221073, 62-224863, and 62-226281, as a method to solve the problem has been proposed, which obtains such internal control points that satisfy the condition of tangent continuation at the common boundary between adjacent frame spaces and use the vector function representing the free-form surface determined by the respective internal control points to patch the patches of free-form surface.

As shown in FIG. 1, in computer-aided artistic design involving free-form surfaces, a smooth surface is represented in a combination of several patches. Generally, in such a case, only patch boundaries are defined as the frames and no internal geometry is defined. Smoothness is the only requirement in most cases. Here, as the methods to determine internal control point vectors $P_{11}$, $P_{12}$, $P_{21}$ and $P_{22}$ defining the internal geometry of a bi-cubic Bezier patch given its boundaries shown in FIG. 2, there have been the methods such that the twist vectors at the four corners of the patch are set to zero, or such that the second-order differential coefficients in the "u" and "v" directions are set to zero, as disclosed by a Japanese Laid-Open Patent Application 62-221073 and pages 65–66, Journal of Precise Engineering Association of Japan 56/3/1990.

However, determining internal control points by the method of setting twist vectors to zero causes the internal geometry of the patch to be greatly influenced by the frame that forms the boundary of that patch. The method of setting the second-order differential coefficients to zero exerts less influence by the frame than the method of setting the twist vectors to zero, however, it has the feature of giving a flat impression. Both methods aim principally at the smoothness in the internal geometry of patches, so that there occurs a problem of no consideration given for connection to adjacent patches.

As shown in FIG. 3, for connecting two adjacent patches A and B, it is known that it is possible to connect the tangent of the patches A and B successively by making the patches A and B to share an edge "b" and making the respective normal lines at the point vectors "f" and "g" on the patches A and B to coincide with each other, as disclosed by a Japanese Laid-Open Patent Application 01-175672. However, in FIG. 4, for connection of the patch A and patch B, internal control point vectors "a", "b", "c" and "d" are to be adjusted, and for connection of the patch B and patch C, internal control point vectors "d", "e", "f" and "g" are to be adjusted. Thus, the internal control point vector "d" is required for connection of both the patches A and B and the patches B and C, so that it is necessary to determine the internal control point vector "d" with consideration for connection of both the patches A and B and the patches B and C. However, this operation has been performed manually, and it is difficult and takes much labor to connect all of the patch A, patch B, patch C and patch D.

SUMMARY OF THE INVENTION

In view of the foregoing, an object of this invention is to provide a free-form surface creation method and apparatus which can automatically determine the internal control points that allow smooth connection of multiple patches to form a surface.

The foregoing object and other objects of the invention have been achieved by the provision of a free-form surface creation method creating a free-form surface by forming a large number of quadrilateral frame spaces each delimited by four boundary curves in a three-dimensional space by frame processing, and by patching the respective quadrilateral frame spaces with the quadrilateral patch represented by a predetermined vector function, wherein: reference normal lines N of a plurality of points defined on each edge ($E_1$, $E_2$, $E_3$, $E_4$) are determined based on the four normal lines ($N_{00}$, $N_{01}$, $N_{10}$, $N_{11}$) of a quadrilateral patch A and four edges ($E_1$, $E_2$, $E_3$, $E_4$); and respective determined reference normal lines N at the plurality of points are approximated to the normal line M at respective points corresponding to a plurality of points defined on edges ($E_1$, $E_2$, $E_3$, $E_4$) of a patch S adjacent to the quadrilateral patch A at each point which are shared with the quadrilateral patch A and the internal control points of the quadrilateral patch A are determined.

Furthermore, the present invention proposes a free-form surface creation apparatus 2 creating a free-form surface by forming a large number of quadrilateral frame spaces each delimited by four boundary curves in a three-dimensional space by frame processing, and by patching the respective quadrilateral frame spaces with the quadrilateral patch represented by a predetermined vector function, comprising: reference normal line determination means for determining reference normal lines N at a plurality of points defined on each edge ($E_1$, $E_2$, $E_3$, $E_4$) based on the four normal lines ($N_{00}$, $N_{01}$, $N_{10}$, $N_{11}$) of a quadrilateral patch A and four edges ($E_1$, $E_2$, $E_3$, $E_4$); and internal control points determination means for approximating respective determined reference normal lines N for the plurality of points to the normal line M at respective points corresponding to a plurality of points defined on edges ($E_1$, $E_2$, $E_3$, $E_4$) of a patch S adjacent to the quadrilateral patch A, each edge being shared with the quadrilateral patch A, so as to and determines the internal control points of the quadrilateral patch A.

The reference normal lines N at a plurality of points defined on each edge ($E_1$, $E_2$, $E_3$, $E_4$) are determined based on the four normal lines ($N_{00}$, $N_{01}$, $N_{10}$, $N_{11}$) of a quadrilateral patch A and four edges ($E_1$, $E_2$, $E_3$, $E_4$); and respective determined reference normal lines N at the plurality of points is approximated to the normal line M at the respective points corresponding to a plurality of points defined on edges ($E_1$, $E_2$, $E_3$, $E_4$) of a patch S adjacent to the quadrilateral patch A at each point which are shared with the quadrilateral patch A so as to determine the internal control points of the quadrilateral patch A. Therefore, the internal control points that allow smooth connection of a curved surface composed of a plurality of patches can be automatically determined.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Structure of CAD/CAM System

Figure 5:
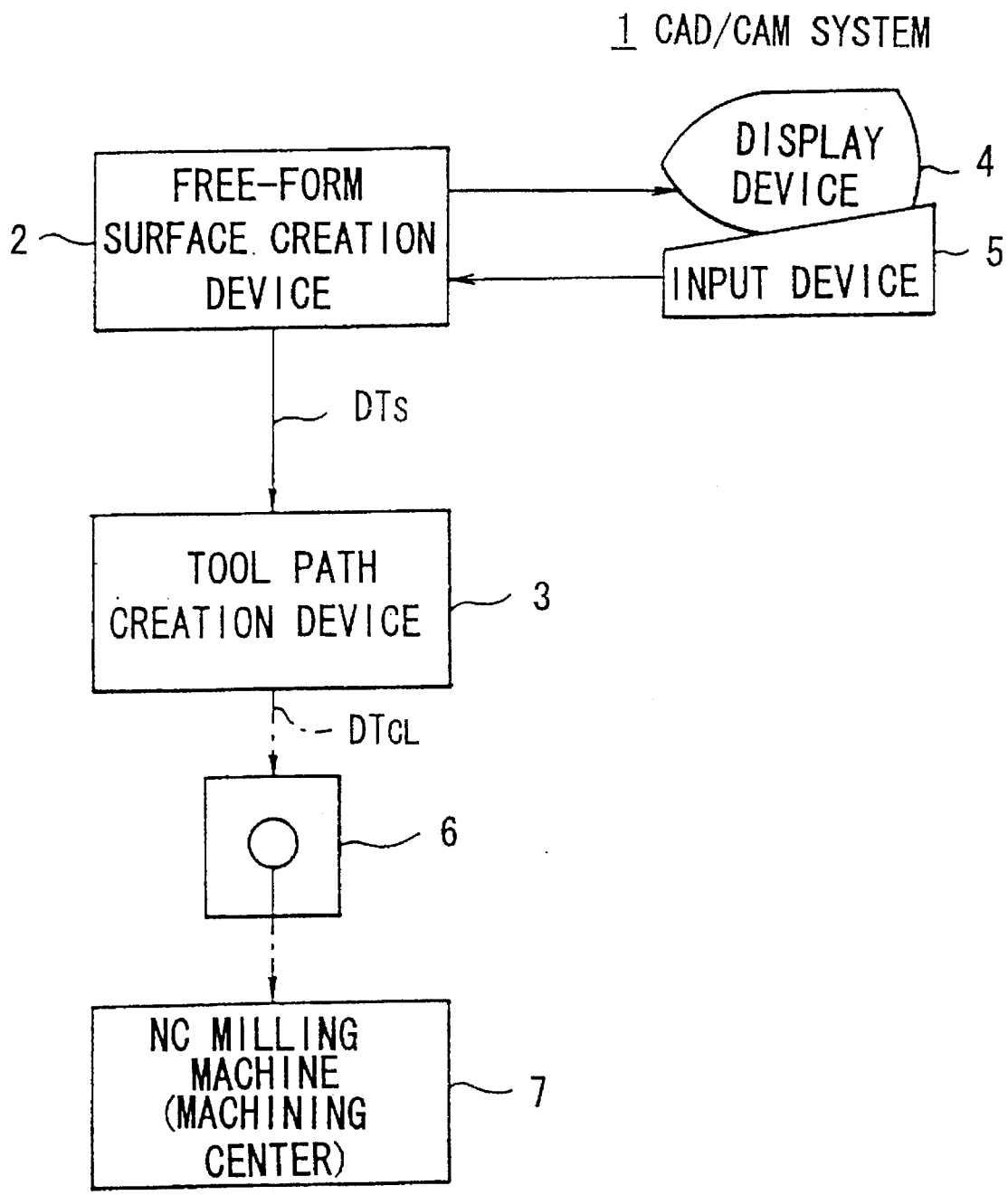
FIG. 5 is a block diagram showing the general construction of an embodiment of CAD/CAM system to which the free-form surface creation method according to the present invention is applied.

In FIG. 5, 1 shows a CAD/CAM system as a whole. A free-form surface creation apparatus 2 creates geometry data $DT_S$ representing a free-form surface, and then a tool path creation device 3 creates processed data $DT_{CL}$ for cutting.

The free-form surface creation apparatus 2 has a CPU (central processing unit). An input device 5 is operated in response to the display on a display device 4, and a wire frame model designated and input by a designer is patched by using a cubic Bezier expression, and then the patch is reconnected. Therefore, the geometry data $DT_S$ representing a body with a free-form surface is created.

On the other hand, at first, the tool path creation device 3 creates the processed data $DT_{CL}$ for roughing and finishing a mold based on the geometry data $DT_S$, and then outputs respective roughing and finishing processed data $DT_{CL}$ to an NC milling machine 7 via, for example, a floppy disk 6. The NC milling machine 7 drives, for example, an NC miller based on the processed data $DT_{CL}$, thereby making a mold of a product represented by the geometry data $DT_S$.

(2) Free-form Surface Creation Method According to the Embodiment

In the embodiment, the free-form surface creation apparatus 2 automatically determines internal control points of a patch so as to obtain a smooth curved surface.

The bi-cubic Bezier patch can be represented by the following equation:

$$S_{(u,v)} = (1-u+uE)^3 (1-v+vF)^3 P_{00} \quad E\ P_{ij}=P_{i+1,j} \quad E\ P_{ij}=P_{i,j+1} \qquad (1)$$

Figure 1:
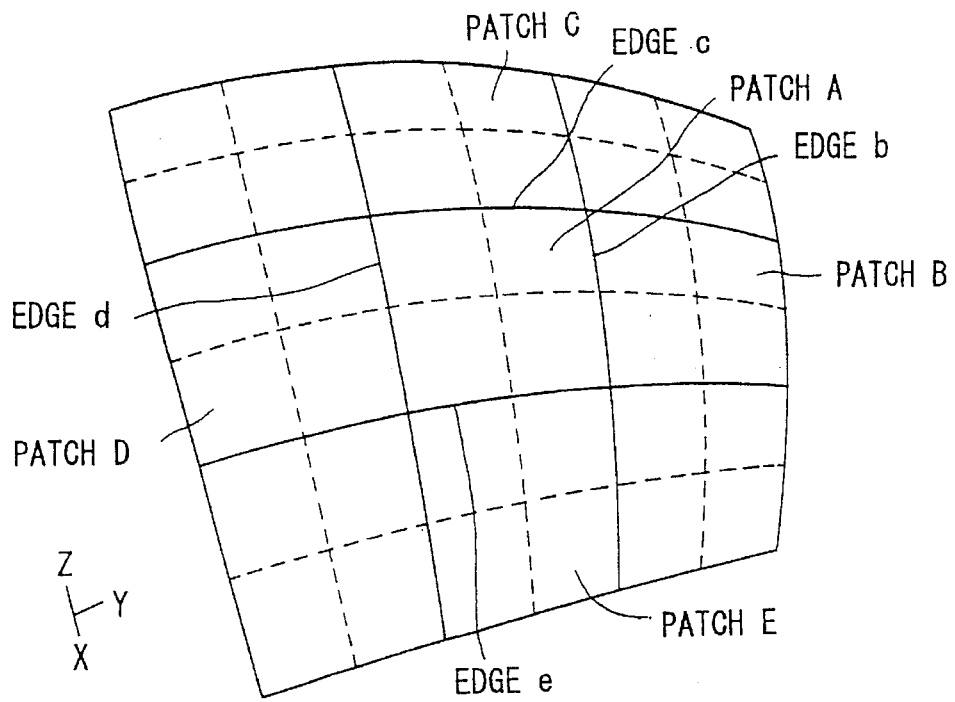
FIG. 1 is a schematic diagram showing a curved surface formed by a combination of a plurality of patches.

Here, $0 \leq u \leq 1$, $0 \leq v \leq 1$. These patches gather to constitute a surface as shown in FIG. 1. Taking a patch A in FIG. 1, the patch A adjoins the patch B, patch C, patch D and patch E at the edge "b", edge "c", edge "d" and edge "e". To form a smooth surface with the patches A, B, C and D, it is sufficient to connect them by tangent each other at the edges "b", "c", "d" and "e". More specifically, making the normal directions of the patches B, C, D and E to coincide with those of the patch A at each point defined on each edge "b", "c", "d" and "e" can connect these patches A, B, C, D and E by tangent each other.

Figure 6:
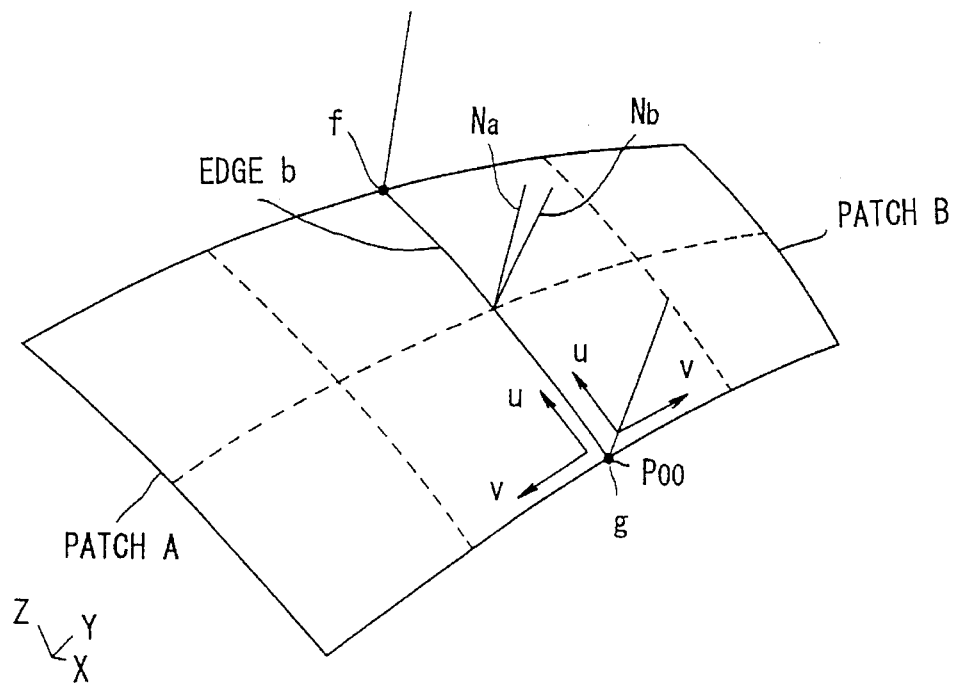
FIG. 6 is a schematic diagram explaining two patches, the patch A and patch B to be connected by tangent.

Here, taking only the patch A and patch B for simplicity of description, the case where the patch A and patch B are connected by tangent is described by using FIG. 6. The normal directions of the patches A and B can be obtained by the outer product of partial differential in the "u" direction and partial differential in the "v" direction of respective patches. Therefore, when the normal lines on the edge "b" of the patches A and B are respectively the normal vectors $N_a$ and $N_b$, the normal direction of the patch A and the normal direction of the patch B can be represented by the following equation:

$$N_a = -\frac{\partial S_{A(u,0)}}{\partial u} \times \frac{\partial S_{A(u,0)}}{\partial v} \quad (2)$$

$$N_b = \frac{\partial S_{B(u,0)}}{\partial u} \times \frac{\partial S_{B(u,0)}}{\partial v}$$

Here, since connecting the patch A and patch B by tangent can be accomplished by making the normal directions of the patches to coincide with each other, the expression for connection by tangent can be represented by following equation:

$$\frac{N_a}{|N_a|} = \frac{N_b}{|N_b|} \quad (3)$$

In FIG. 6, it is assumed that the normal directions of the patches A and B coincide with each other at the point vectors "f" and "g". If the normal directions do not coincide with each other at the point vectors "f" and "g" as described above, it is impossible to connect the patches A and B by tangent anyhow the control points are controlled.

The edge "b", which is the boundary between the patches A and B, is represented by the following equation:

$$\begin{aligned}
C(u) &= (1-u+uE)^3 P_{00} \quad (4)\\
&= \{(1-u)^3 + 3(1-u)^2 uE + 3(1-u)u^2E^2 + u^3E^3\} P_{00}\\
&= (1-u)^3 P_{00} + 3(1-u)^2 u P_{10} + 3(1-u)u^2 P_{20} + u^3 P_{30}
\end{aligned}$$

where $0 \leq u \leq 1$. And, the normal direction of a patch at a point on the edge can be represented by the following equation:

$$\frac{\partial S_{(u,v)}}{\partial u} \times \frac{\partial S_{(u,v)}}{\partial v} = (1-v+vF)^3 \, 3(1-u+ \quad (5)$$

$$uE)^2 (E-1)P_{00} \times (1-u+uE)^3 \, 3(1-v+vF)^2 (F-1)P_{00}$$

Figure 2:
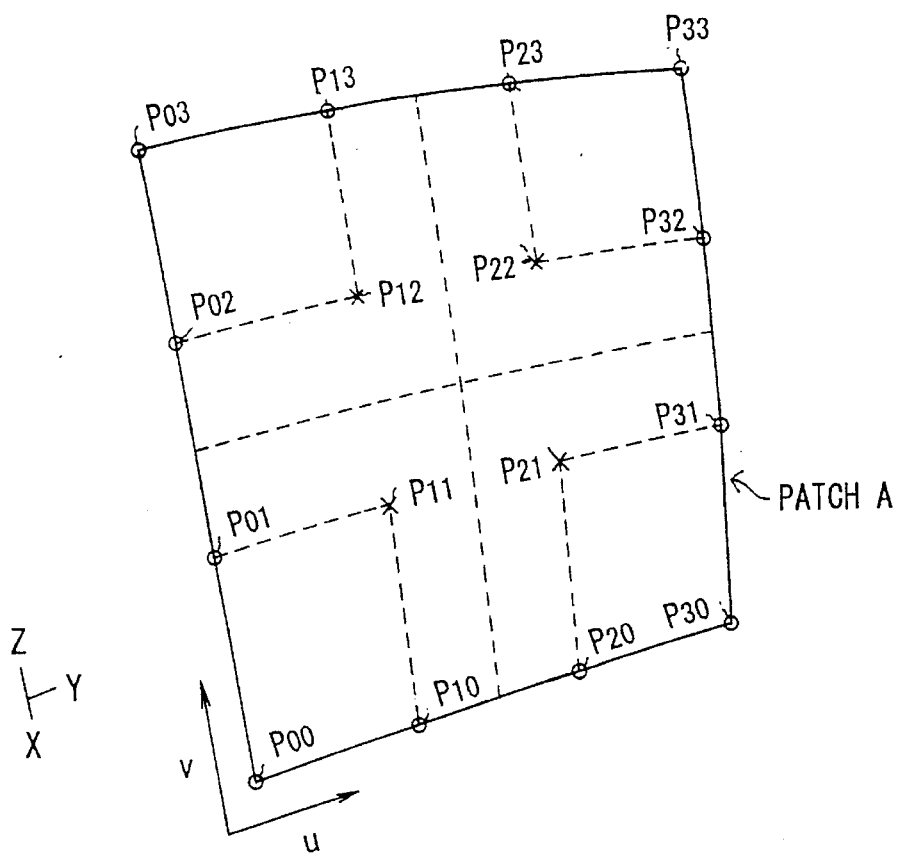
FIG. 2 is a schematic diagram showing a bi-cubic Bezier patch.
Figure 3:
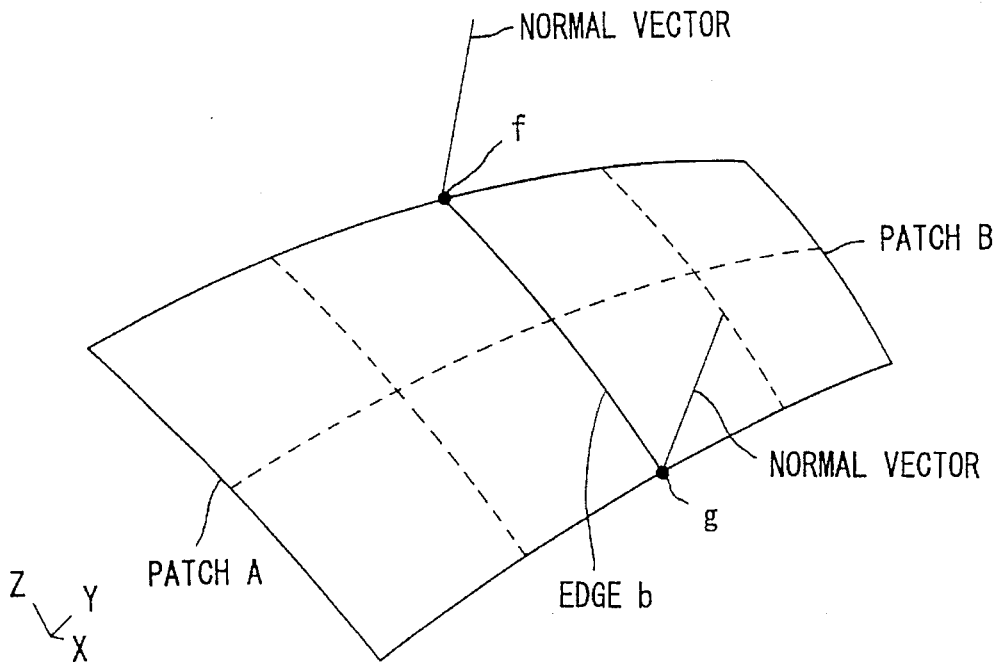
FIG. 3 is a schematic diagram explaining a connection to an adjacent patch.

Therefore, the normal directions of the patch A in FIG. 2 at its four corner points, that is, at the point vectors $P_{00}$, $P_{30}$, $P_{03}$ and $P_{33}$ can be represented by the following equation:

$$\begin{aligned}
P_{00} &= \frac{\partial S_{(0,0)}}{\partial u} \times \frac{\partial S_{(0,0)}}{\partial v} \quad (6)\\
&= (E-1)P_{00} \times (F-1)P_{00} = (P_{10}-P_{00}) \times (P_{01}-P_{00})\\[4pt]
P_{30} &= \frac{\partial S_{(1,0)}}{\partial u} \times \frac{\partial S_{(1,0)}}{\partial v}\\
&= (E^3-E^2)P_{00} \times E^3(F-1)P_{00} = (P_{30}-P_{20}) \times (P_{31}-P_{30})\\[4pt]
P_{03} &= \frac{\partial S_{(0,1)}}{\partial u} \times \frac{\partial S_{(0,1)}}{\partial v}\\
&= F^3(E-1)P_{00} \times (F^3-F^2)P_{00} = (P_{13}-P_{03}) \times (P_{03}-P_{02})
\end{aligned}$$

-continued $$\begin{aligned}
P_{33} &= \frac{\partial S_{(1,1)}}{\partial u} \times \frac{\partial S_{(1,1)}}{\partial v}\\
&= F^3 E^2(E-1)P_{00} \times F^2 E^3(F-1)P_{00}\\
&= (P_{33}-P_{23}) \times (P_{33}-P_{32})
\end{aligned}$$

which is obtained by substituting parameter values (0, 0), (1, 0), (0, 1) and (1, 1) in the equation (5) and expanding it. Here, internal control point vectors $P_{11}$, $P_{12}$, $P_{21}$ and $P_{22}$ do not occur in the equations (4) and (6), and this indicates that the edge "b" and the normal directions of the point vectors $P_{00}$, $P_{30}$, $P_{03}$ and $P_{33}$ at the four corners of the patch A have no relation with, and are independent of, these internal control point vectors $P_{11}$, $P_{12}$, $P_{21}$ and $P_{22}$. This means that moving the internal control point vectors $P_{11}$, $P_{12}$, $P_{21}$ and $P_{22}$ in the patch A does not change the normal directions of the point vectors $P_{00}$, $P_{30}$, $P_{03}$ and $P_{33}$ at the four corners of the patch A.

Figure 4:
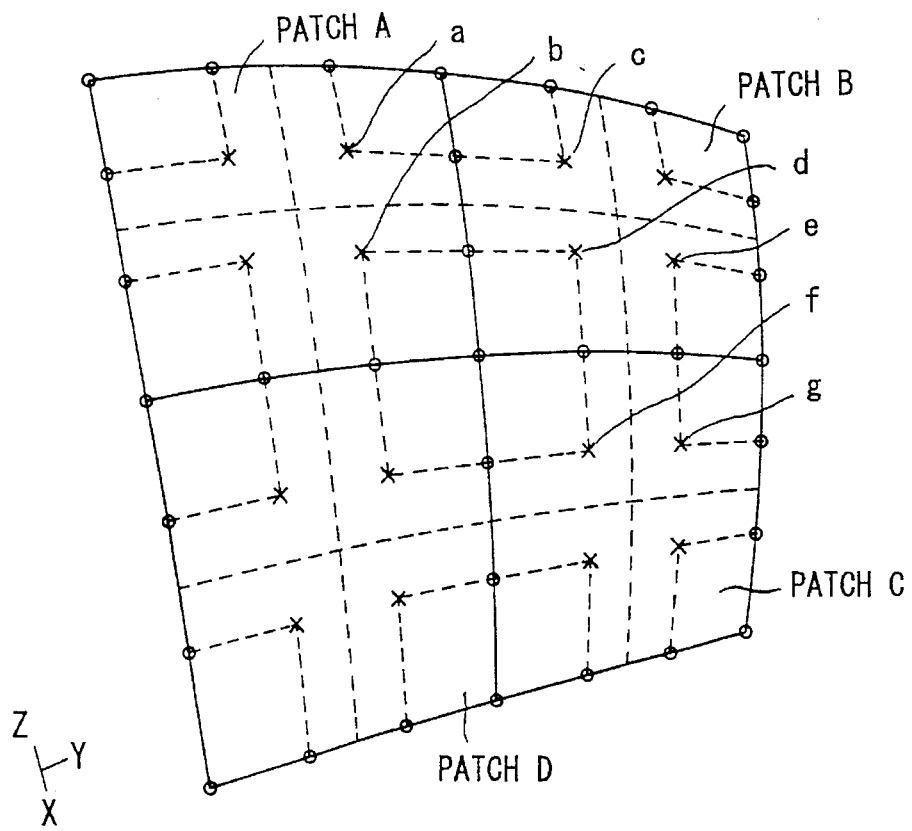
FIG. 4 is a schematic diagram explaining a connection of patches.

It is found from the above that the normal directions of the point vectors "f" and "g" and the edge "b" in FIG. 4 are common to the patches A and B, and are information independent of the internal control point vectors $P_{11}$, $P_{12}$, $P_{21}$ and $P_{22}$. Therefore, if the normal vectors $N_a$ and $N_b$ of both patches on the edge "b" are determined by using the information common to the patches A and B, it is possible to obtain the same normal direction by taking either the patch A only or the patch B only. Because the normal vectors $N_a$ and $N_b$ obtained above are information independent of the internal control points, they are not influenced by operating the internal control points of a patch to control its normal directions. Therefore, it is possible to make the surface smooth by modifying each patch independently. The operation described above is simultaneously applied to the four edges "a", "b", "c" and "d" of the patch A, so that the curved surface can be smooth.

Figure 8:
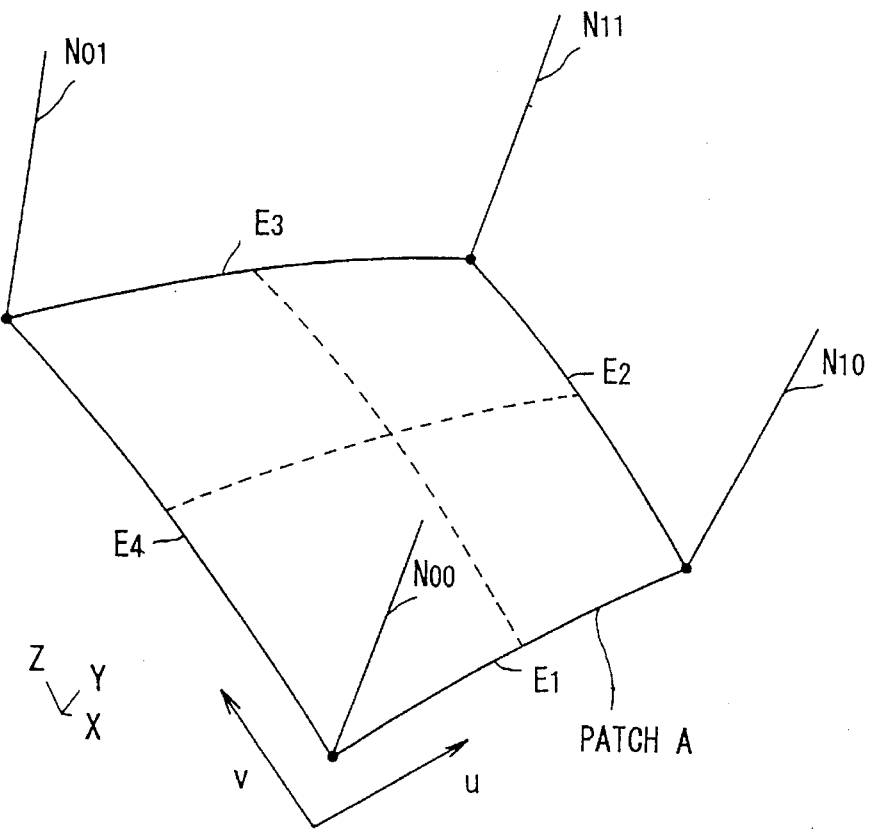
FIG. 8 is a schematic diagram explaining method to determine normal vectors on an edge.

Next, the method for determining a reference normal direction and for making the normal direction of a patch S adjacent to the patch. A to coincide with the determined reference normal direction are described. The free-form surface creation apparatus 2 starts from step SP1 in FIG. 7, and at step SP2, determines reference normal directions. As shown in FIG. 8, it is assumed that the normal vectors $N_{00}$, $N_{01}$, $N_{10}$ and $N_{11}$ are as the normal lines of the patch A at its four corners, and edges $E_1$, $E_2$, $E_3$ and $E_4$ are as its four edges. As described above, these four normal vectors $N_{00}$, $N_{01}$, $N_{10}$ and $N_{11}$ do not change even when the internal control points are moved. And, for the patch A to be connected by tangent to the adjacent patch S, it is required that these four normal vectors $N_{00}$, $N_{01}$, $N_{10}$ and $N_{11}$ should be common to both patches. Therefore, a reference normal vector N is determined from these four normal vectors $N_{00}$, $N_{01}$, $N_{10}$ and $N_{11}$ and the four edges $E_1$, $E_2$, $E_3$ and $E_4$ shared with the adjacent patch S.

Figure 9:
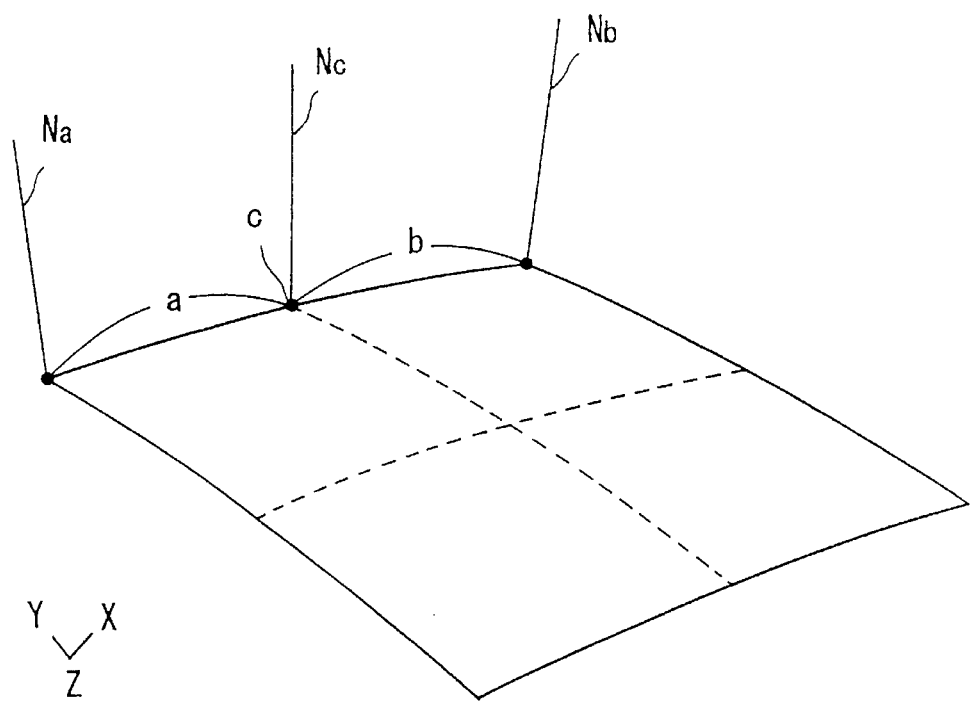
FIG. 9 is a schematic diagram explaining the first method to determine normal vectors on an edge.

One of methods for determining the reference normal vector N is the method for determining it by the ratio of the distances from each point defined on each edge to both end points of the edge containing the respective points based on the amount of vector of the normal lines at both end points of each edge. For example, as shown in FIG. 9, the normal vector $N_c$ at a point vector C on an edge is linearly interpolated between the normal vectors $N_a$ and $N_b$ at both end points, at the ratio of distances divided at the point vector C, that is, a:b. Accordingly, the normal vectors $N_{00}$, $N_{01}$, $N_{10}$ and $N_{11}$ at the four corners in FIG. 8 are represented by the following equation:

$$N_{00} = \frac{\partial S_{(0,0)}}{\partial u} \times \frac{\partial S_{(0,0)}}{\partial v} \tag{7}$$

$$N_{10} = \frac{\partial S_{(1,0)}}{\partial u} \times \frac{\partial S_{(1,0)}}{\partial v}$$

$$N_{01} = \frac{\partial S_{(0,1)}}{\partial u} \times \frac{\partial S_{(0,1)}}{\partial v}$$

$$N_{11} = \frac{\partial S_{(1,1)}}{\partial u} \times \frac{\partial S_{(1,1)}}{\partial v}$$

and the normal vector $N_c$ at the point vector C on the edge can be represented by the following equation:

$$N_c = \frac{a}{a+b} \times N_b + \frac{b}{a+b} \times N_a \tag{8}$$

assuming the normal vectors $N_a$ and $N_b$ to be normalized. Thus, a normal line is determined at each point defined on each edge.

The other methods for determining the reference normal vector N is the method for second-order differentiating each edge to integrate variation of curvature obtained as a result of second-order differentiating, and for determining in accordance with the integrated value of the variation from each point defined on each edge to both end points of the edge containing the respective points. This is described with reference to FIG. 10. The second-order differential on an edge is represented by the following equation:

$$C''(u) = 6(1-u+uE)(E-1)^2 P_0 \tag{9}$$

and the integral F of C'' is represented by the following equation:

$$F = \int 6|(1-u+uE)(E-1)^2 P_0 \tag{10}$$

Assuming the value of the parameter at the point vector C on an edge to be $U_c$, the normal vector $N_c$ can be represented by the following equation:

$$G_1 = \int_0^1 Fdu \quad G_2 = \int_0^{u_c} Fdu \quad G_3 = \int_{u_c}^1 Fdu \tag{11}$$

$$N_c = \frac{G_3}{G_1} \times N_2 + \frac{G_2}{G_1} \times N_b$$

Thus, it is possible to obtain a reference normal vector N on an edge.

Figure 7:
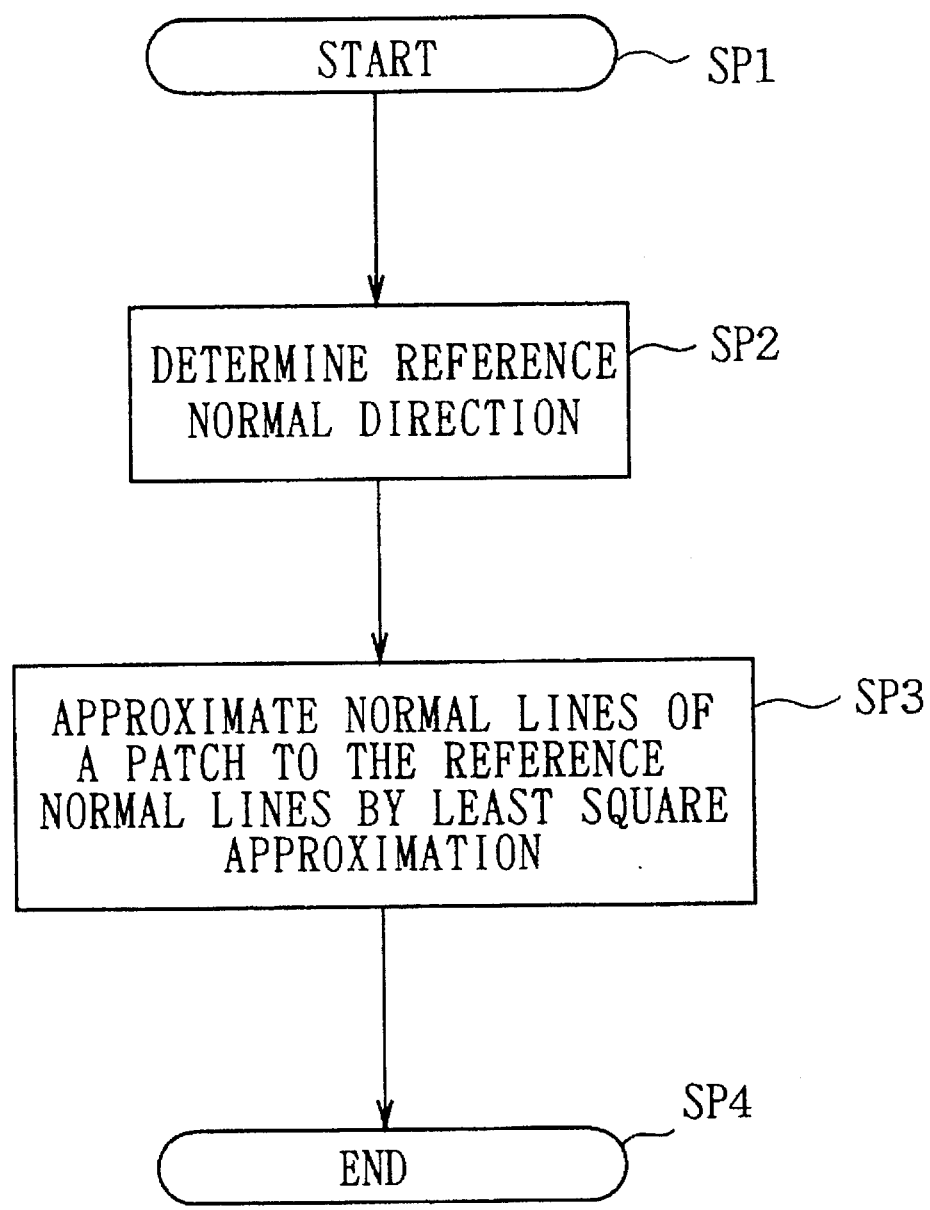
FIG. 7 is a flowchart showing the processing procedure of the free-form surface creation apparatus.
Figure 10:
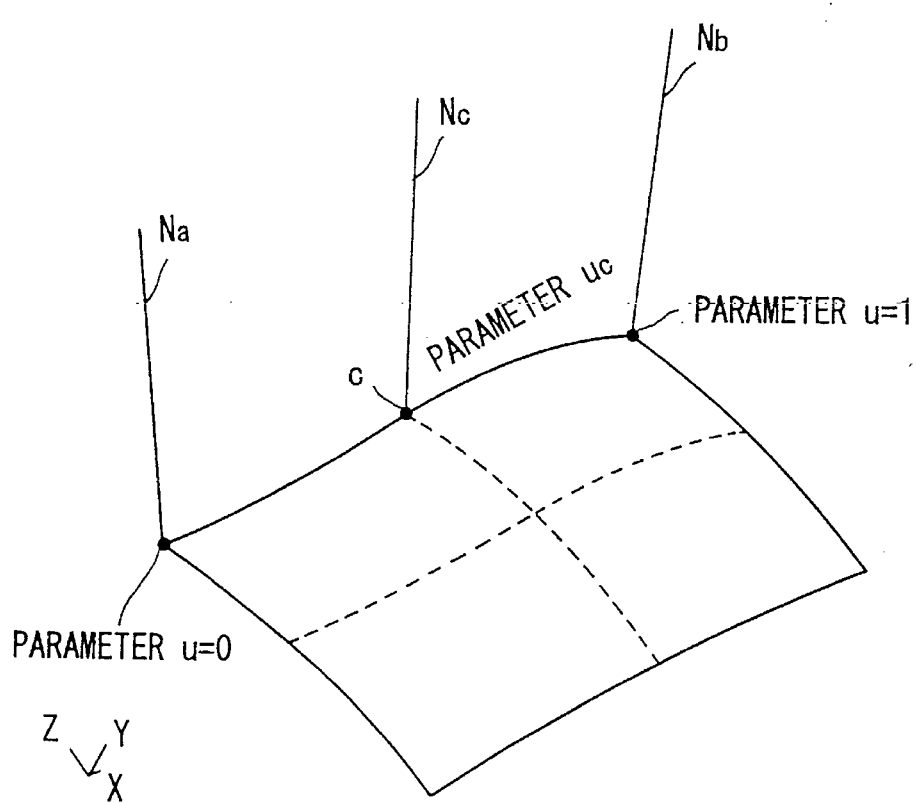
FIG. 10 is a schematic diagram explaining the second method to determine normal vectors on an edge.
Figure 11:
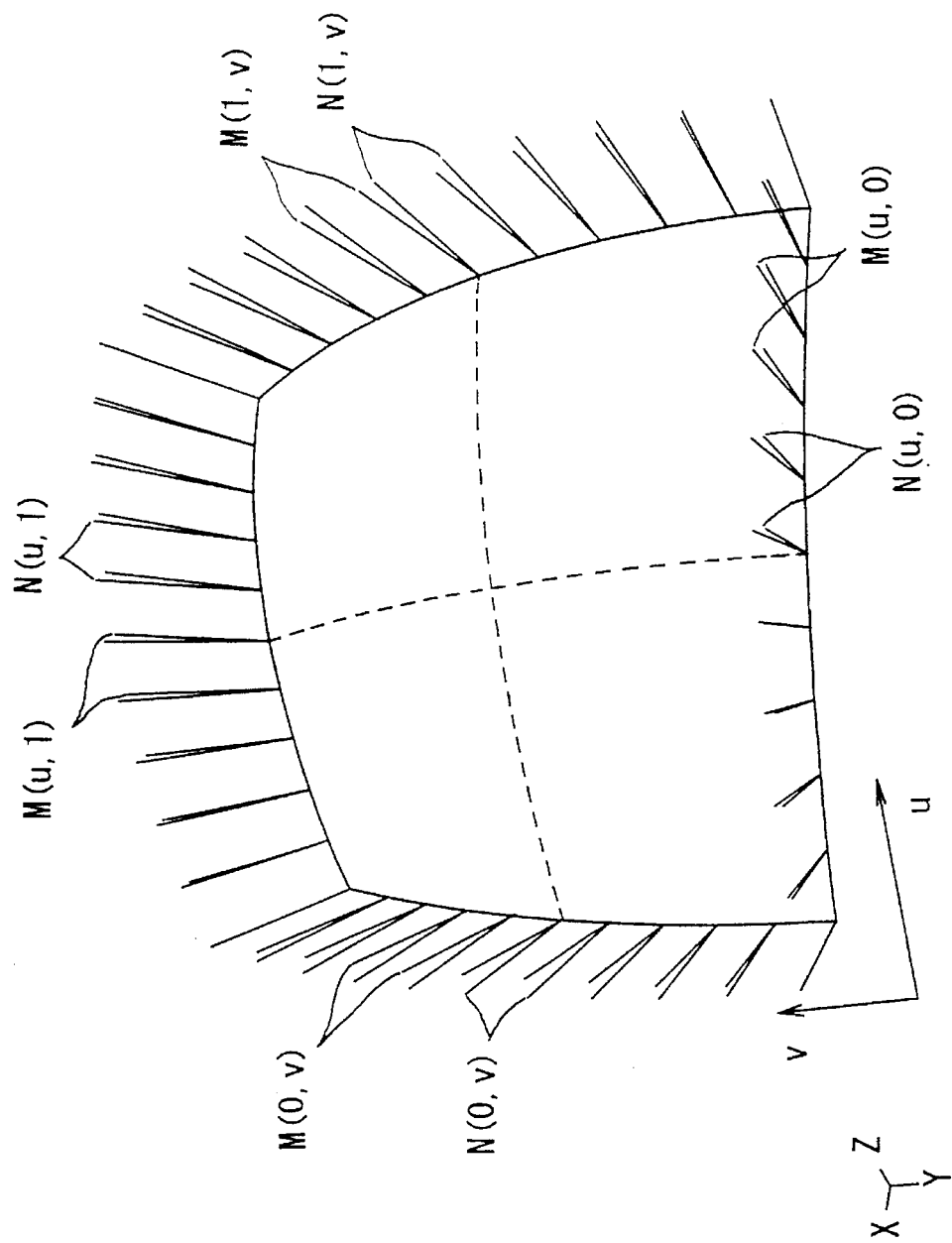
FIG. 11 is a schematic diagram explaining an approximation of a normal vector on an edge to a reference normal vector.

Once a reference normal vector N at each point defined on an edge is obtained, at step SP3 in FIG. 7, the free-form surface creation apparatus 2 performs processing to bring the normal direction of the patch S close to the reference normal direction by least square approximation. That is, this processing adjust the normal directions of the patch S to the directions of the reference normal vectors N. In FIG. 10, to make the reference normal vectors N coincide with the normal vectors M on an edge of the patch S, it is necessary that the outer product of N(u, v) and the normal vectors M (u, v) (where $0 \leq u \leq 1$, $0 \leq v \leq 1$) on an edge of the patch S obtained by the following equation:

$$M_{(u,0)} = \frac{\partial S_{(u,0)}}{\partial u} \times \frac{\partial S_{(u,0)}}{\partial v} \tag{12}$$

-continued $$M_{(u,1)} = \frac{\partial S_{(u,1)}}{\partial u} \times \frac{\partial S_{(u,1)}}{\partial v}$$

$$M_{(0,v)} = \frac{\partial S_{(0,v)}}{\partial u} \times \frac{\partial S_{(0,v)}}{\partial v}$$

$$M_{(1,v)} = \frac{\partial S_{(1,v)}}{\partial u} \times \frac{\partial S_{(1,v)}}{\partial v}$$

satisfy the following equation:

$$(M_{(u,0)}, N_{(u,0)}) = 1$$

$$(M_{(u,1)}, N_{(u,1)}) = 1$$

$$(M_{(0,v)}, N_{(0,v)}) = 1$$

$$(M_{(1,v)}, N_{(1,v)}) = 1 \tag{13}$$

From the equation (13) with the parameter arbitrary defined and the outer product of the reference normal direction N at a point defined on each edge and the normal direction M on the corresponding edge of the patch S, the following equation:

$$\sum_{i=0}^{10} \{(M_{(u,0)}, N_{(u,0)}) - 1\} + \sum_{i=0}^{10} \{(M_{(u,1)}, N_{(u,1)}) - 1\} + \tag{14}$$

$$\sum_{i=0}^{10} \{(M_{(0,v)}, N_{(0,v)}) - 1\} + \sum_{i=0}^{10} \{(M_{(i,v)}, N_{(1,v)}) - 1\} = 0$$

is obtained, where u=i/10 and v=i/10. With the equation (14), an approximation is carried out with the internal control points as unknowns by least square approximation, and the processing is terminated at step SP4. The method of least square approximation is disclosed in patent application Ser. 08/267,838 filed on Jun. 28, 1994, by the same applicant, which is a continuation of patent application Ser. No. 07/853,918 filed on Mar. 19, 1992, now abandoned. The corresponding EP patent application was laid open on Sep. 23, 1992 published as 0504889 A2.

With a constitution as above, internal control points of the patch A are obtained from the four corners and four edges which are independent of the internal control points of the patch A and in which information is common with the adjacent patches without referencing to the information of adjacent patches. Thus, it is possible to automatically determine such internal control points that allow a smooth surface to be created.

Figure 13:
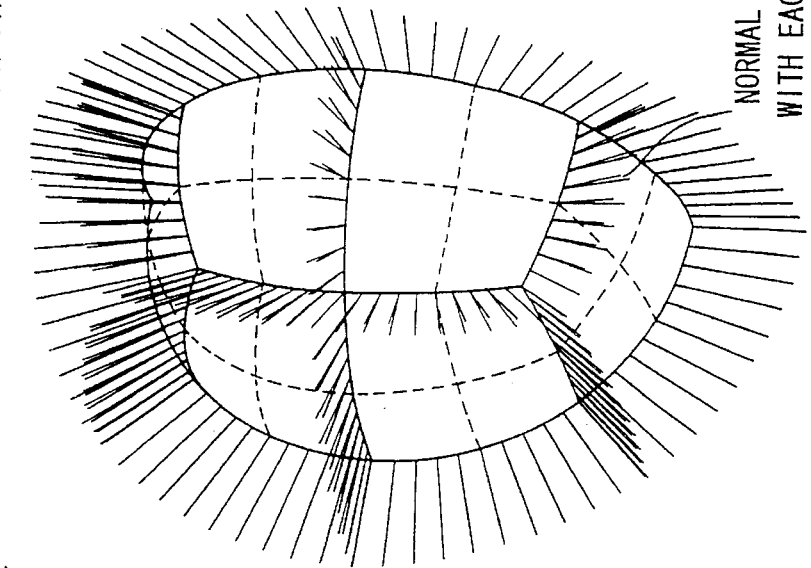
FIG. 13 is a schematic diagram showing a quarter sphere created by a conventional method.
Figure 12:
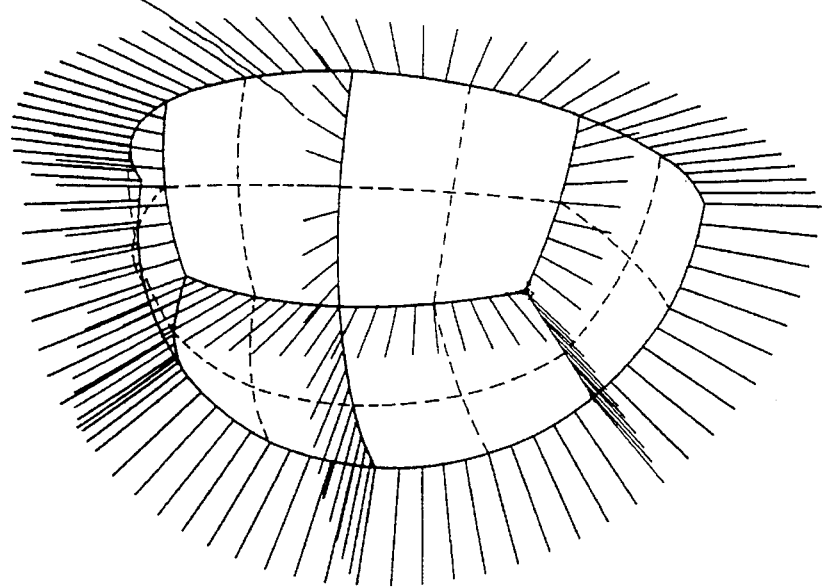
FIG. 12 is a schematic diagram showing a quarter sphere created by the free-form surface creation method according to the present invention.

Incidentally, as shown in FIGS. 12 and 13, a quarter sphere created by a conventional method (FIG. 12) has normal lines that do not coincide with each other, thus is not connected by tangent. On the other hand, a quarter sphere created according to the embodiment of the present invention (FIG. 13) has normal lines that coincide with each other, thus is connected by tangent.

In the embodiment described above, a parameter is defined on each edge such that u=i/10 and v=i/10. However, the present invention is not only limited to this, but the number of parameters can be altered as the occasion demands.

Furthermore, in the embodiment described above, reference normal lines at multiple points defined on each edge of a quadrilateral patch are determined, based on the four edges, and the normal lines at the four corner points, of the quadrilateral patch and in accordance with the ratio of the distances from a plurality of points defined on respective edges to both end points of respective edges containing the respective points. However, the present invention is not only limited to this, but the reference normal lines can be determined in another way.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A free-form surface creation method for creating a free-form surface by forming a large number of quadrilateral frame spaces each delimited by four boundary curves in a three-dimensional space by frame processing, and by patching the respective quadrilateral frame spaces with a quadrilateral patch represented by a predetermined vector function, wherein:

reference normal lines of a plurality of points defined on respective four edges are determined based on four normal lines of said quadrilateral patch and said four edges; and said respective determined reference normal lines at said plurality of points are approximated to normal lines at respective points corresponding to said plurality of points defined on the edges of a patch adjacent to said quadrilateral patch, each edge being shared with said quadrilateral patch, so as to determine internal control points of said quadrilateral patch are determined.

2. The free-form surface creation method according to claim 1, wherein:

said reference normal lines are determined on said each edge, based on the amount of vector of normal lines at both end points of said each edge and in accordance with the ratio of distances from each of said plurality of points defined on said each edge to both end points of the edge containing each of said plurality of points.

3. The free-form surface creation method according to claim 1, wherein:

value of the variation of curvature obtained by second order differentiating said respective edges are integrated based on the amount of vector of the normal lines at both end points of said each edge, and in accordance with said integrate value of the variation of curvature from each of said plurality of points defined on said each edge to both end points of the edge containing each of said plurality of points, thus said reference normal lines are determined on said each edge.

4. The free-form surface creation method according to claim 1, wherein:

said reference normal lines to said quadrilateral patch at said plurality of points defined on said each edge and said normal lines to a patch adjacent to said quadrilateral patch at the points corresponding to said plurality of points are approximated by least square approximation method.

5. A free-form surface creation apparatus for creating a free-form surface by forming a large number of quadrilateral frame spaces each delimited by four boundary curves in a three-dimensional space by frame processing, and by patching the respective quadrilateral frame spaces with a quadrilateral patch represented by-a predetermined vector function, comprising:

reference normal line determination means for determining reference normal lines at a plurality of points defined on respective four edge based on four normal lines of said quadrilateral patch and said four edges; and internal control point determination means for determining internal control points of said quadrilateral patch by approximating said respective determined reference normal lines at said plurality of points and normal lines at respective points corresponding to said plurality of points defined on the edges of a patch adjacent to said quadrilateral patch, each edge being shared with said quadrilateral patch.

6. The free-form surface creation apparatus according to claim 5, wherein:

said reference normal line determination means determines said reference normal lines, on said each edge, based on the amount of vector of normal lines at both end points of said each edge and in accordance with the ratio of distances from each of said plurality of points defined on said each edge to both end points of the edge containing each of said plurality of points.

7. The free-form surface creation apparatus according to claim 5, wherein:

said reference normal line determination means integrates value of the variation of curvature obtained by second order differentiating said respective edges, based on the amount of vector of the normal lines at both end points of said each edge, and determines said reference normal lines, on said each edge, in accordance with said integrate value of the variation of curvature from each of said plurality of points defined on said each edge to both end points of the edge containing each of said plurality of points.

8. The free-form surface creation apparatus according to claim 5, wherein:

said internal control point determination means approximates said reference normal lines to said quadrilateral patch at said plurality of points defined on said each edge and said normal lines to a patch adjacent to said quadrilateral patch at the points corresponding to said plurality of points by least square approximation method.

* * * * *